United States Patent
Baeckler

(10) Patent No.: US 9,461,837 B2
(45) Date of Patent: Oct. 4, 2016

(54) CENTRAL ALIGNMENT CIRCUTRY FOR HIGH-SPEED SERIAL RECEIVER CIRCUITS

(71) Applicant: Altera Corporation, San Jose, CA (US)

(72) Inventor: Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 431 days.

(21) Appl. No.: 13/931,720

(22) Filed: Jun. 28, 2013

(65) Prior Publication Data

US 2015/0003477 A1    Jan. 1, 2015

(51) Int. Cl.
*H04L 12/40* (2006.01)
*H04L 25/14* (2006.01)
*H04J 3/06* (2006.01)

(52) U.S. Cl.
CPC .............. *H04L 12/40* (2013.01); *H04L 25/14* (2013.01); *H04J 3/0697* (2013.01)

(58) Field of Classification Search
CPC ... G06F 13/42; G06F 13/4204; H04L 12/40; H04L 25/14; H04J 3/0697
See application file for complete search history.

(56) References Cited

U.S. PATENT DOCUMENTS

| | | | |
|---|---|---|---|
| 5,742,840 A | 4/1998 | Hansen et al. | |
| 6,167,077 A | 12/2000 | Ducaroir et al. | |
| 6,690,757 B1 | 2/2004 | Bunton et al. | |
| 6,961,347 B1 | 11/2005 | Bunton et al. | |
| 8,495,264 B1 * | 7/2013 | Hammer | G06F 13/12 375/354 |
| 2006/0209735 A1 * | 9/2006 | Evoy | H04L 7/041 370/315 |
| 2007/0189283 A1 * | 8/2007 | Agarwal | H04L 45/00 370/388 |
| 2010/0284486 A1 | 11/2010 | Kuwata | |
| 2011/0268133 A1 * | 11/2011 | Cucchi | H03M 9/00 370/465 |
| 2012/0106687 A1 * | 5/2012 | Bulzacchelli | H04L 25/14 375/354 |
| 2012/0230373 A1 * | 9/2012 | Hennedy | H04L 25/4908 375/219 |
| 2012/0230455 A1 * | 9/2012 | Hennedy | H04L 25/14 375/354 |

\* cited by examiner

*Primary Examiner* — Paul H Masur
(74) *Attorney, Agent, or Firm* — Michael H. Lyons

(57) ABSTRACT

The implementation of serial transmission protocols typically involves the transmission of data in form of serial data streams over multiple serial communication links in parallel. Upon reception, the serial data streams are aggregated to implement a behavior equivalent to the transmission of the data over a single serial communication link. A high-speed serial communication receiver with a central alignment control circuit is provided that performs the identification of word boundaries within each serial data stream, the alignment of all the serial data streams, and the arrangement of the serial communication links in a given order. Using a single central alignment control circuit reduces the circuit area required for performing these operations, facilitates a reduced latency, and can easily control a simplified switching network.

29 Claims, 10 Drawing Sheets

CENTRAL ALIGNMENT CIRCUTRY FOR HIGH-SPEED SERIAL RECEIVER CIRCUITS

BACKGROUND

This invention relates to high-speed serial receiver circuitry and, more particularly, to handling the alignment of serial data streams received over multiple serial communication links.

Integrated circuits communicate with one another via communications pathways such as an input-output (I/O) buses. An increasingly important communications type is data communication in the form of serial data streams over serial communication links.

The implementation of recent serial transmission protocols, such as 100G Ethernet or Interlaken, typically involves the transmission of data in form of serial data streams over multiple serial communication links in parallel. Upon reception, the serial data streams are aggregated to implement a behavior equivalent to the transmission of the data over a single serial communication link. The aggregation of the serial data streams may involve the reception of synchronized serial data streams in a given order of serial communication links.

A situation may arise where a variation in the transmission delays between the multiple serial communication links causes the serial data streams to become misaligned. Some serial transmission protocols also allow serial communication links to become reordered during transmission. Thus, circuitry is required to perform processing steps to ensure alignment of received serial data streams. The processing steps include identification of word boundaries within each serial data stream, the alignment of all the serial data streams, and the arrangement of the serial communication links in a given order. Separate, independent state machine circuitry is typically assigned to each of the processing steps.

SUMMARY

In accordance with some embodiments described herein, a method for operating serial receiver circuitry may include the steps of receiving serial data over multiple serial lanes and using a central alignment circuit to identify a current order of the serial lanes and to configure a multi-stage switching network to arrange the serial lanes in a desired order based on the current order. The central alignment circuit may identify framing bits that delimit words in the serial data of each serial lane and align the words in the serial data of each serial lane based on the framing bits.

It is appreciated that the present invention can be implemented in numerous ways, such as a process, an apparatus, a system, a device, or instructions executed on a programmable processor. Several inventive embodiments of the present invention are described below.

In certain embodiments, the above-mentioned central alignment circuit may identify relative delays between the serial data in the serial lanes and align the serial lanes by correcting the relative delays between the serial lanes.

If desired, the central alignment circuit may monitor the alignment of the serial lanes to detect a misalignment, and in the event that a misalignment is detected, may identify the relative delays between the serial data in the serial lanes and align the serial lanes to compensate for the relative delays.

Further features of the invention, its nature and various advantages, will be more apparent from the accompanying drawings and the following detailed description of the preferred embodiments.

DETAILED DESCRIPTION

Embodiments of the present invention relate to high-speed serial receiver circuitry and, more particularly, to handling the alignment of serial data streams received over multiple serial communication links, which are sometimes also referred to as channels, serial lanes, or lanes. If desired, each serial communication link may be time partitioned into multiple virtual serial communication links, which are sometimes also referred to as virtual channels or virtual lanes.

The implementation of recent serial transmission protocols typically involves the parallel transmission of data in form of serial data streams over multiple serial communication links. A variation in the transmission delays between the multiple serial communication links may cause the serial data streams to become misaligned. Some serial transmission protocols also allow serial communication links to become reordered during transmission. Thus, circuitry is required to perform common processing steps upon reception of the serial data streams. These processing steps may include the identification of word boundaries within each serial data stream, sometimes also referred to as word alignment, word lock, block lock, or framing lock, the alignment of all the serial data streams, sometimes also referred to as channel alignment, lane alignment, or lane de-skew, and the arrangement of the serial communication links in a given order, sometimes also referred to as lane reordering, multi-lane distribution, or reordering.

A central alignment control circuit (e.g., instead of separate state machine circuits) may be used to control the execution of some or all processing steps related to the alignment of serial data streams and the reordering of serial communication links. The use of a central alignment control circuit may provide several advantages compared to the use of multiple separate state machine circuits. For example, a central alignment control circuit may use less circuit resources, execute some or all processing steps in parallel, thereby reducing the latency of the alignment and reordering operations, and control a more complex switching network compared to what a state machine circuit can control, thereby further reducing the required circuit resources.

It will be obvious to one skilled in the art, that the present exemplary embodiments may be practiced without some or all of these specific details. In other instances, well-known operations have not been described in detail in order not to unnecessarily obscure the present embodiments.

Figure 1:
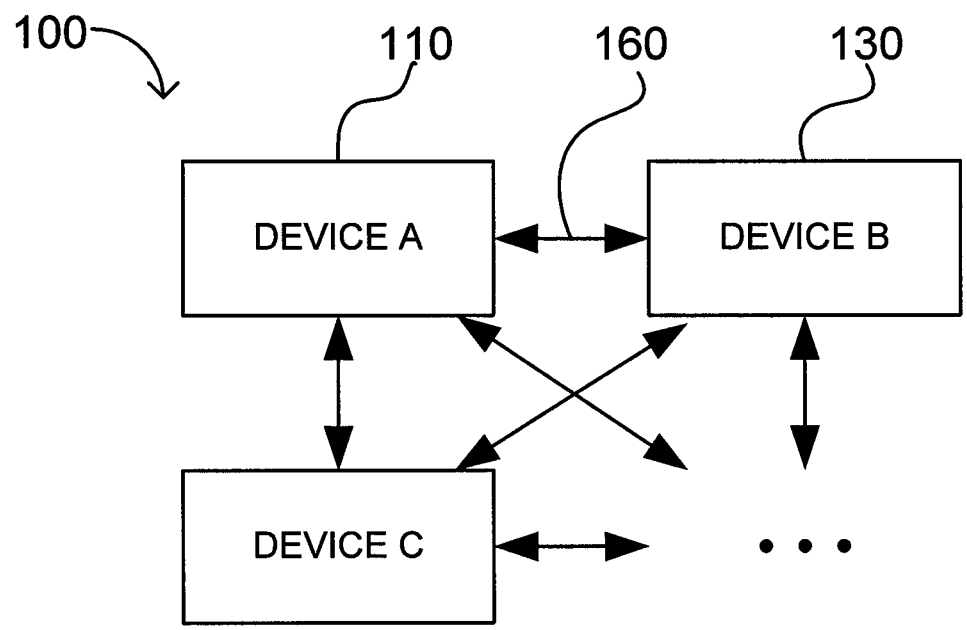
FIG. 1 is a diagram of illustrative interconnected electronic devices that may communicate using serial data streams in accordance with an embodiment of the present invention.

An illustrative system 100 of interconnected electronic devices is shown in FIG. 1. The system of interconnected electronic devices may have multiple electronic devices such as device A (shown as 110 in FIG. 1), device B (shown as 130 in FIG. 1), device C, and interconnection resources 160. The electronic devices may be any suitable type of electronic device that communicates with other electronic devices. Examples of such electronic devices include basic electronic components and circuits such as analog circuits, digital circuits, mixed-signal circuits, and integrated circuits that are interconnected on a printed-circuit board (PCB). Examples of such electronic devices also include complex electronic systems such as network routers and cell phone base stations or parts thereof that communicate with each other over wired or wireless networks.

Interconnection resources 160 such as conductive lines and busses, optical interconnect infrastructure, or wired and wireless networks with optional intermediate switches may be used to send signals from one electronic device to another electronic device or to broadcast information from one electronic device to multiple other electronic devices.

Figure 2:
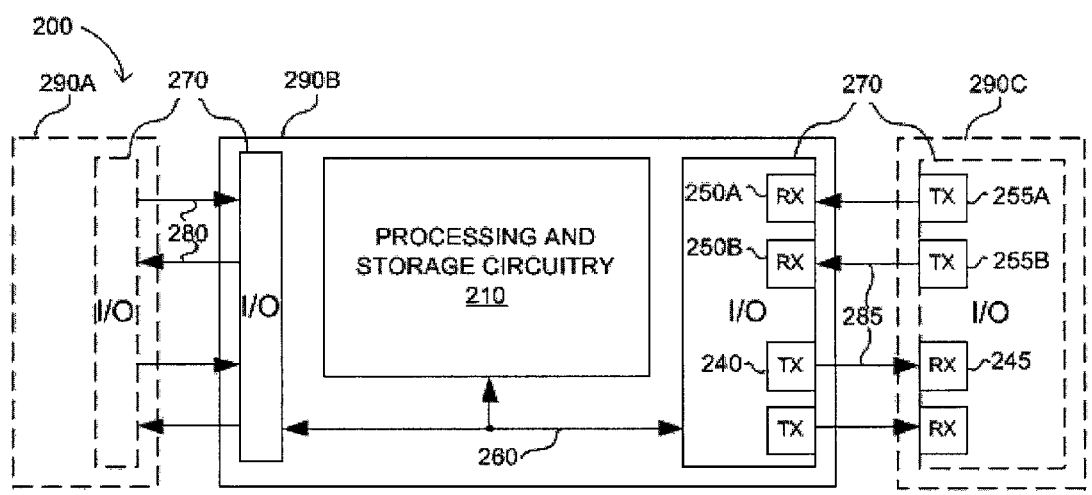
FIG. 2 is a diagram of illustrative interconnected integrated circuits that may communicate using serial data streams over high-speed serial communication links in accordance with an embodiment of the present invention.

FIG. 2 shows an illustrative embodiment of a system 200 of electronic devices 290 (e.g., devices 290A, 290B, and 290C). In the example of FIG. 2, electronic devices 290 are integrated circuits. Exemplary integrated circuits (ICs) include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), microprocessors, microcontrollers, and application specific integrated circuits (ASICs). Integrated circuits 290A, 290B, and 290C may be assembled in different ways. For example, integrated circuits 290 may be in different packages, in the same package, stacked with wire-bond connections, or assembled using through-silicon-vias (TSV), just to name a few.

Integrated circuits 290 may include processing and storage circuitry 210 such as random-access memory (RAM), first-in first-out (FIFO) circuitry, stack or last-in first-out (LIFO) circuitry, read-only memory (ROM), or other memory elements, embedded microprocessors, digital signal processors (DSP), microcontrollers, or other processing circuitry, and interconnection resources 260 such as conductive lines and busses. Interconnection resources 260 may be used to send signals from one component to another component or to broadcast signals from one component to one or more other components. The integrated circuit may include input/output circuitry 270 which may include parallel input/output circuitry, differential input/output circuitry, serial data transceiver circuitry having one or more serial transmitter circuits such as transmitter circuits 240A and 240B and one or more serial receiver circuits such as receiver circuits 250A and 250B, or any other desired input/output circuitry. Input/output circuitry 270 may transmit and receive signals over interconnection resources 280 (e.g., when communicating with other devices using parallel input/output circuitry) or over serial communication links such as serial communication links 285 when communicating with other devices using serial data transceiver circuitry.

For example, transmitter 240 in input/output circuitry 270 of integrated circuit 290B may transmit serialized data signals at a given transmission rate as a data stream over a serial communication link 285 to integrated circuit 290C where the serial data is received by receiver circuit 245. Similarly, integrated circuit 290C may use transmitter 255A to transmit serialized data signals as a data stream over a serial communication link 285 to integrated circuit 290B.

If desired, multiple serial communication links may be used to transmit data. For example, multiple transmitters (e.g., transmitters 255A and 255B of integrated circuit 290C) may each transmit a portion of the data as serial data streams over multiple serial communication links to multiple receivers (e.g., receivers 250A and 250B of integrated circuit 290B). Upon reception, receiver circuitry may restore the data by aggregating the portions of the data received at the multiple receivers. The aggregation of portions of the data may require that the serial data streams are aligned and in a given order (e.g., to correctly reconstruct the original data from the partitioned data streams).

As an example, the implementation of a 100G Ethernet link may use four serial communication links 285 each operating at 25 Gbps and each carrying five virtual channels for a total of 20 virtual channels. Alternatively, a 100G Ethernet link may use ten serial communication links each operating at 10 Gbps and each carrying two virtual channels.

The transmission of data over multiple serial communication links in parallel may make the data transmitted over these links vulnerable to external influences (e.g., a difference in cable length or electrical properties) which may cause variations in the transmission delays between links. Such variations in the transmission delays between the serial communication links may cause the serial data streams to become misaligned. The Ethernet protocol also allows serial communication links to become reordered during transmission. Thus, circuitry is required to perform synchronization processing steps upon reception of the serial data streams. These processing steps may include the identification of word boundaries within each serial data stream, the alignment of the serial data streams, and the arrangement of the serial communication links in a given order.

Figure 3:
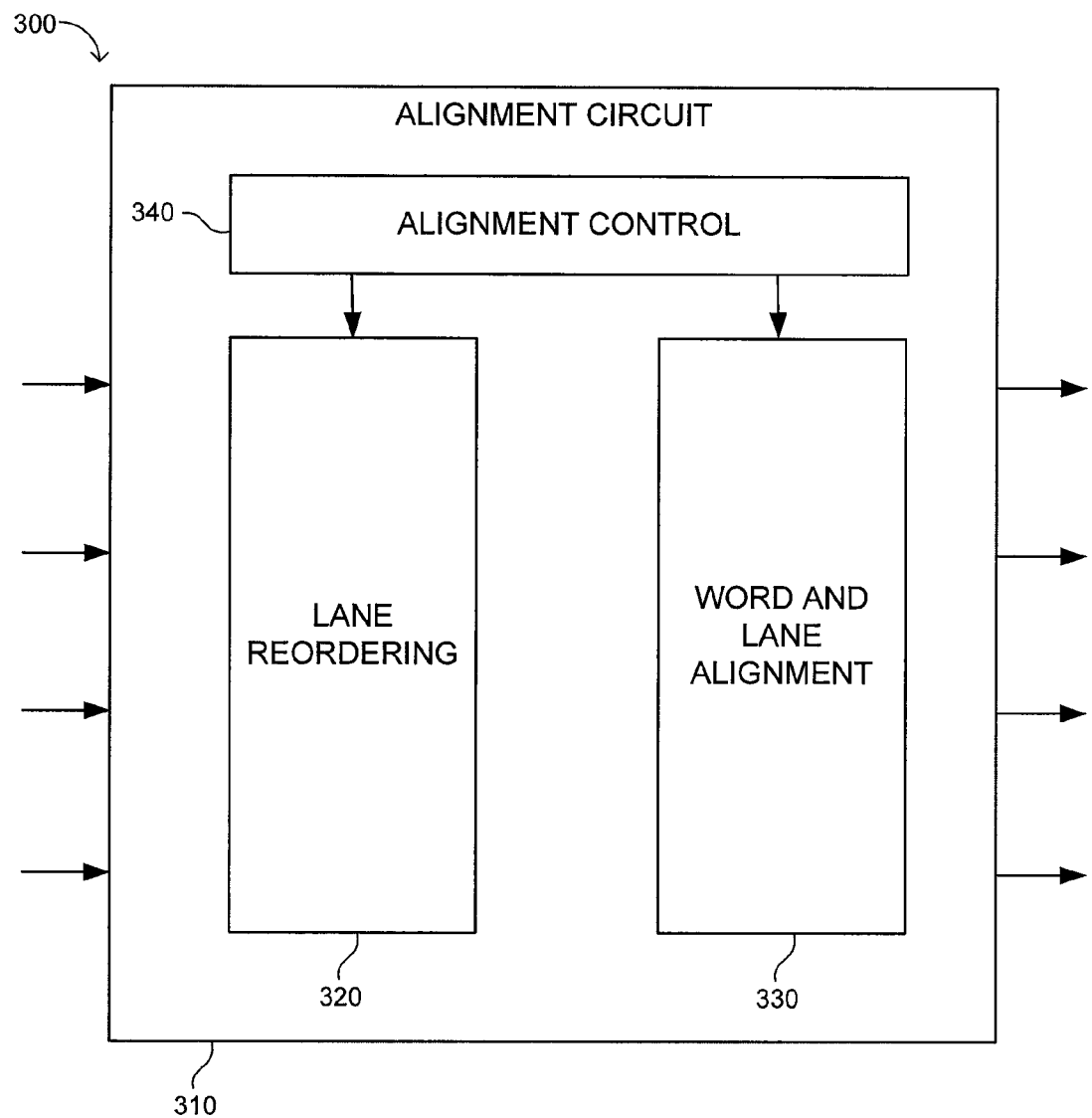
FIG. 3 is a diagram of illustrative high-speed serial receiver circuitry for performing word alignment, lane reordering, and lane alignment, controlled by a central alignment control circuit in accordance with an embodiment of the present invention.

FIG. 3 shows an embodiment of a high-speed serial receiver 300 which includes an alignment circuit 310 that performs lane reordering in a lane reordering circuit 320, as well as word alignment and lane alignment in word and lane alignment circuit 330, controlled by an alignment control circuit 340. As shown, the alignment circuit 310 may receive four serial data streams over four serial communication links.

Figure 4:
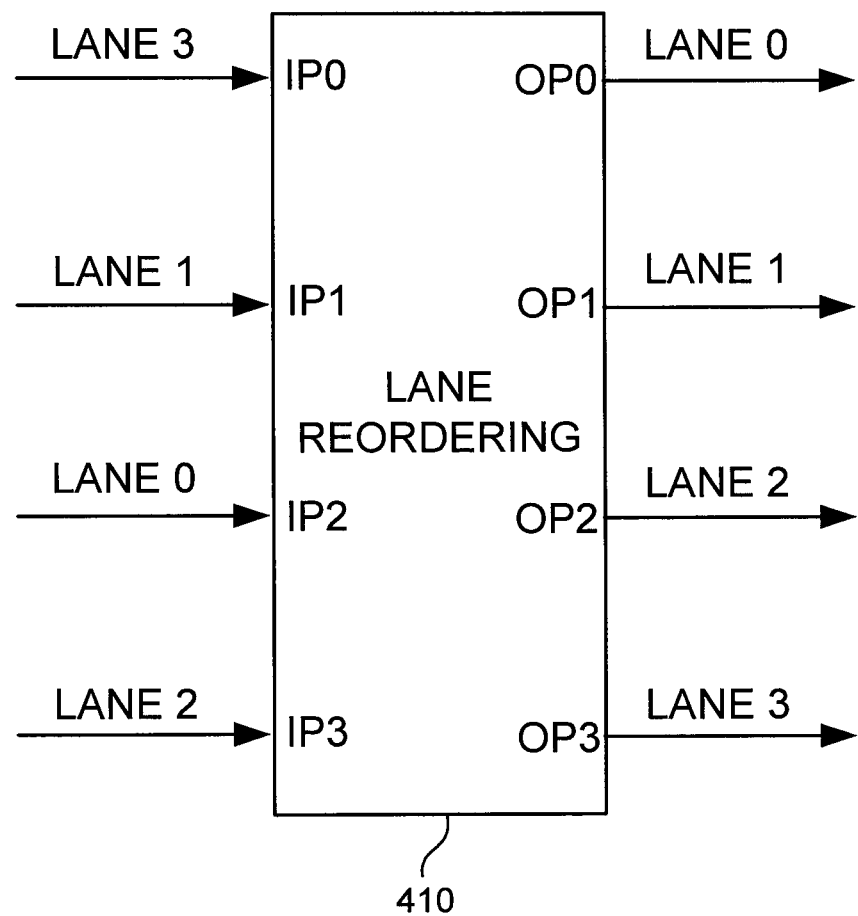
FIG. 4 is a diagram of illustrative lane reordering that may be performed by serial receiver circuitry in accordance with an embodiment of the present invention.

Lane reordering circuit 320 may reorder the serial data streams. FIG. 4 shows an embodiment for performing lane reordering using lane reordering circuit 410. Consider the scenario in which the serial data streams are received in the order lane 3, lane 1, lane 0, followed by lane 2 (i.e., lane 3 is coupled to input port 0 (IP0), lane 1 to IP1, lane 0 to IP2, and lane 2 to IP3) and the desired order on the output of lane reordering circuit 410 is lane 0, lane 1, lane 2, followed by lane 3 (i.e., lane 0 coupled to output port 0 (GP0), lane 1 to OP1, lane 2 to OP2, and lane 3 to OP3). In this scenario, alignment control circuit 340 of FIG. 3 needs to configure lane ordering circuit 410 to couple input port IP0 to output port OP3, input port IP1 to output port OP1, input port IP2 to output port OP0, and input port IP3 to output port OP2.

Lane reordering circuit 410 may include a crossbar switch which is sometimes also referred to as a crossbar, a matrix switch, a cross-point switch, or a full crossbar. A crossbar switch has a given number of input ports and output ports and programmable interconnect that may be configured to connect each of the output ports to any of the input ports. For example, lane reordering circuit 410 may include serial communication links connected to the input ports and serial communication links connected to the output ports and programmable switches (e.g., pass transistors) that allow the connection of any output port with any input port. Alternatively, lane reordering circuit 410 may include four 4:1 multiplexers. Each multiplexer may be coupled to all four input ports and drive a different output port. In this scenario, configuring the crossbar may include configuring the multiplexers' selection bits to selectively couple output ports to input ports.

Figure 5:
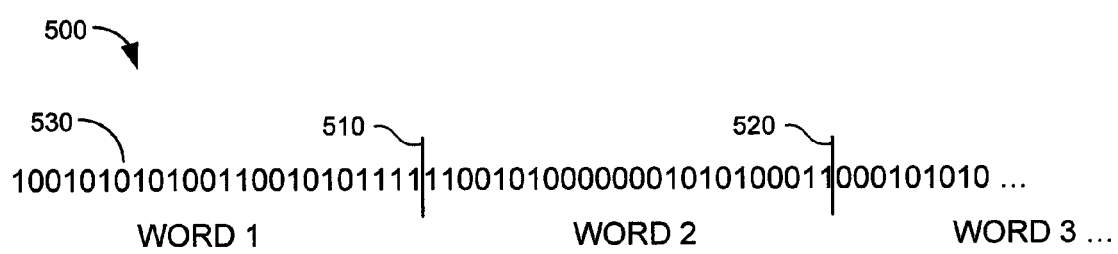
FIG. 5 is a diagram of illustrative word alignment that may be performed by serial receiver circuitry on a serial stream in accordance with an embodiment of the present invention.

Word and lane alignment circuit 330 in alignment circuit 310 may receive the serial data streams and perform word alignment by identifying word boundaries in the respective serial data stream. FIG. 5 shows an embodiment for performing word alignment 500 in a single serial data stream. Word alignment may require the identification of synchronization data (e.g., framing bits) embedded in the serial data stream and counting the number of bits that constitute a word. For example, words in Ethernet may be 66 bits wide and the last two bits (i.e., the framing bits) of every word are opposite (e.g., having inverted logical values). As another example, the framing bits may have the same value, such as "11". Thus, word alignment may require the repeated identification of framing bits. For every identified set of framing bits, word alignment may receive another 66 bits and verify that the last two bits are again framing bits.

Consider the scenario in which each word has 24 bits and the framing bits are "11". The word and lane alignment circuit may inspect the serial data stream 530 for framing bits (e.g., using a comparator or pattern matching circuit). In the example of FIG. 5, the word and lane alignment circuit may shift the serial data stream 530 bit by bit and look for a bit "1" that is followed by another bit "1" and find potential word boundaries after bit 14, after bit 22, after bit 23, after bit 24, after bit 25, after bit 26, and after bit 48. Only the potential word boundaries after bit 24 and after bit 48 are 24 bits apart and thus form the actual word boundaries 510 and 520 which separate the words of the serial data stream.

Figure 6:
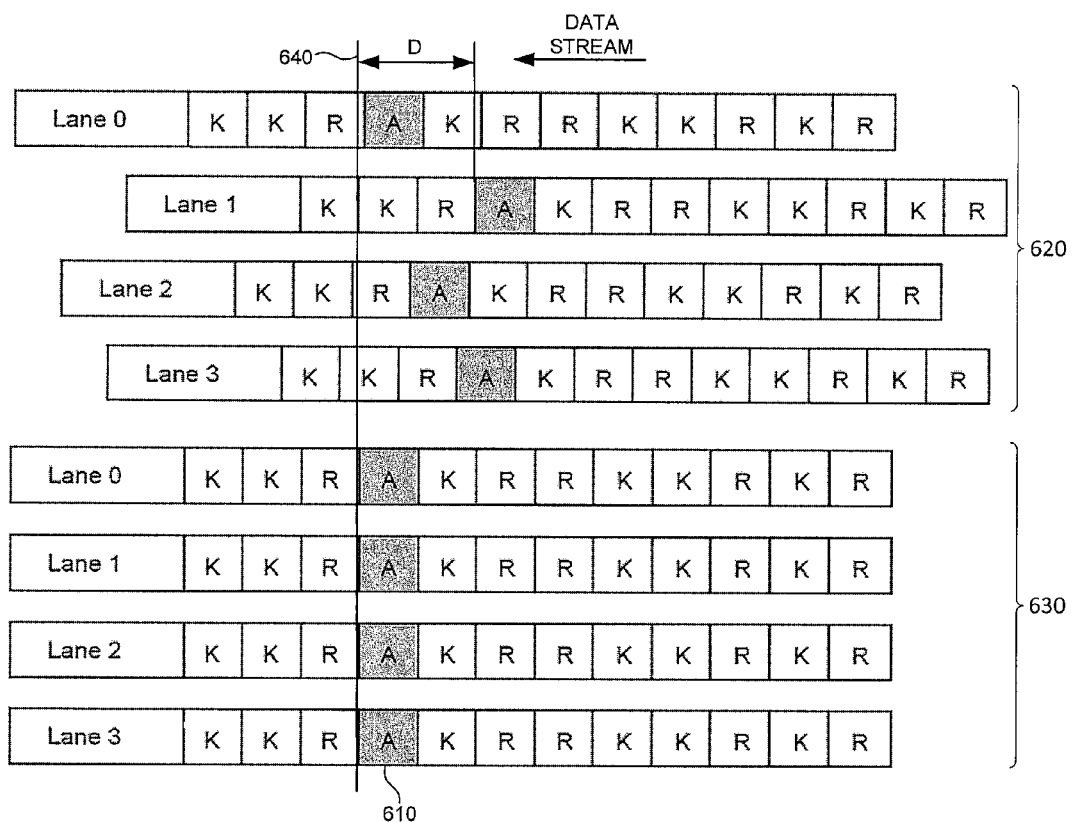
FIG. 6 is a diagram of illustrative lane alignment between serial streams that maybe performed by serial receiver circuitry in accordance with an embodiment of the present invention.

Word and lane alignment circuit 330 of FIG. 3 may perform lane alignment by aligning the received serial data streams over different serial communication links with each other. FIG. 6 shows a scenario in which lane alignment circuit 330 may perform alignment operations on misaligned lanes 620 to produce aligned lanes 630. Lane alignment may require the identification of synchronization data such as an alignment tag or a particular code word embedded in the serial data stream. In the example of FIG. 6, the alignment tag may be the word "A" 610. Each lane of lanes 620 may be monitored for detecting the alignment tag "A". When the alignment tag "A" is detected in one of the lanes the lane may be halted or delayed (e.g., using delay circuitry) until the alignment tag "A" is received in each lane. In the example of FIG. 6, line 640 represents the progression of the alignment tag through each of the lanes. Alignment tag "A" is first detected for lane 0 at time T0. Lane 0 may be delayed by a time D until the last alignment tag "A" is detected in lane 1 at time T1. Once the alignment tag of lane 1 arrives at 640, all lanes are aligned as shown in 630.

Word and lane alignment may be performed in separate steps as previously described. Word and lane alignment may also be performed in a single processing step. For example, word and lane alignment circuit 330 in FIG. 3 may inspect each lane for an alignment tag without prior word alignment. The identification of the alignment tag may enable lane alignment and also provide the word boundaries for word alignment.

Alignment circuit 310 may perform lane reordering and word and lane alignment in any order. For example, alignment circuit 310 may perform lane reordering followed by word and lane alignment or word and lane alignment followed by lane reordering.

Figure 7:
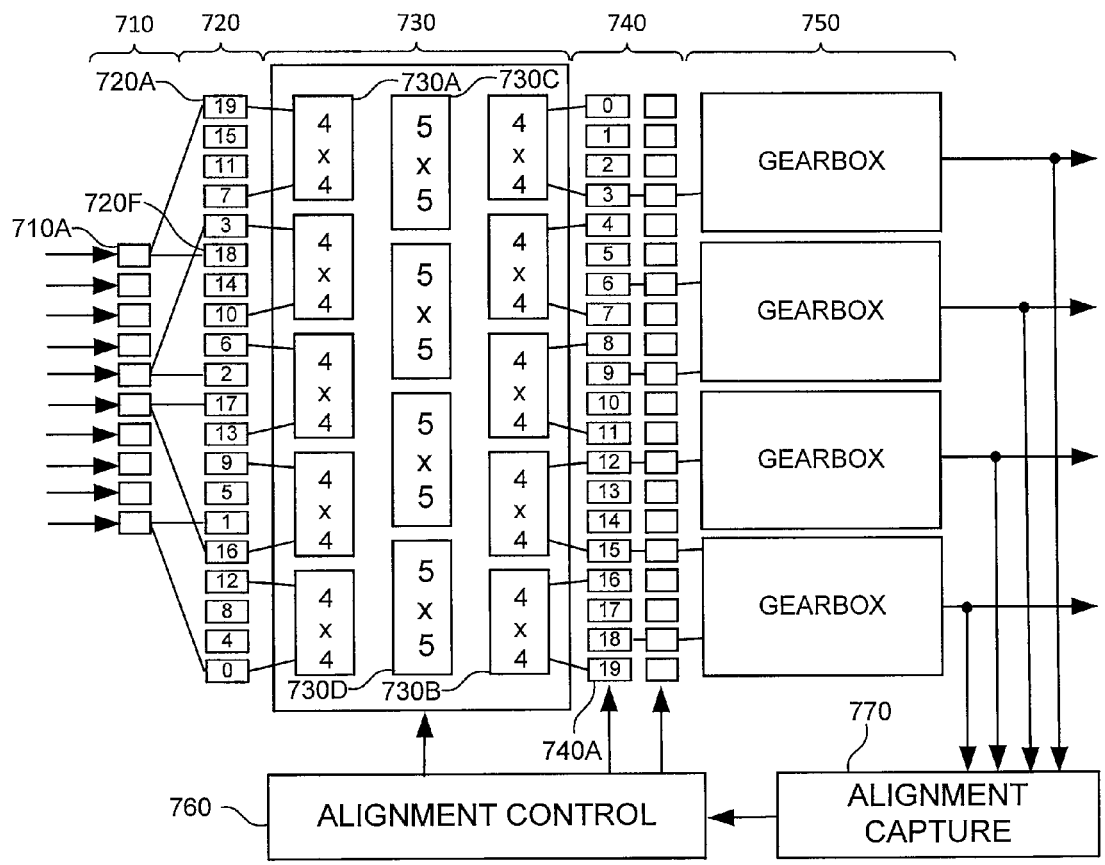
FIG. 7 is a diagram of an illustrative high-speed serial receiver circuitry with multiple high-speed serial communication links, a Clos network for lane reordering, multiple delay stages for lane alignment and word alignment, an alignment capture circuit, and an alignment control circuit in accordance with an embodiment of the present invention.

FIG. 7 is a diagram of an illustrative high-speed serial receiver circuitry with ten high-speed serial communication links 710. The data carried by the ten high-speed serial communication links may be distributed over 20 serial channels 720. For example, every even bit from one of the ten high-speed serial communication links 710A may be conveyed by one of the serial channels 720A, while every odd bit from the same high-speed serial communication link 710A may be conveyed by another one of the serial channels 720F.

The serial channels 720 may have an arbitrary order at this stage. For example, the top-most serial channel may convey a serial data stream with a desired position of 19 while the second serial channel from the top conveys a serial data stream with a desired position of 15, etc. Thus, a switching network such as multi-stage switching network 730 may reorder the serial channels 720 to arrange the serial channels in a desired order as displayed by serial channels 740. In the example of FIG. 7, the desired order is sequential from position 0 to position 19. However, switching network 730 may be used to reorder the received data streams in any desired order.

In the example of FIG. 7, multi-stage switching network 730 is implemented as a three-stage Clos network. The three-stage Clos network may have an input stage having five 4×4 crossbars, an intermediate stage having four 5×5 crossbars, and an output stage having five 4×4 crossbars. If desired, the Clos network may have different crossbar arrangements in the input, intermediate, and output stages. For example, the input and output stages may each have ten 2×2 crossbars and the intermediate stage two 10×10 crossbars. More general, consider the scenario in which the Clos network has k input ports and k output port and in which k=r*n. In this scenario, the input stage may have r n×m (i.e., n by m) crossbars, the output stage r m×n crossbars, and the intermediate stage m r×r crossbars.

If desired, multi-stage switching network may be implemented as a Clos network with any odd number of stages (e.g., a five-stage Clos network) or any other multi-stage switching network such as a folded Clos network, a Benes network, or an Omega network, just to name a few. Alternatively, a single-stage switching network (e.g., a 20×20 crossbar switch) may replace the multi-stage switching network. The implementation of a 20×20 crossbar switch may have more switches and thus require more circuit area than the implementation of a Clos network. However, a 20×20 crossbar switch can always connect an unused input port to any unused output port without re-arranging existing connections. Therefore, a single 20×20 crossbar is also sometimes referred to as being strictly non-blocking. In contrast, a three-stage Clos network as previously described can always connect an unused input port to any unused output port if m is greater or equal to n. However, the Clos network may need to re-arrange some of the existing connections. A three-stage Clos network as previously described is strictly non-blocking only if m is greater or equal to (2n−1). Thus, as described with respect to the embodiment of FIG. 7, alignment control 760 which configures multi-stage switching network 730 may need to reconfigure some of the existing connections when configuring multi-stage switching network 730.

Figure 8:
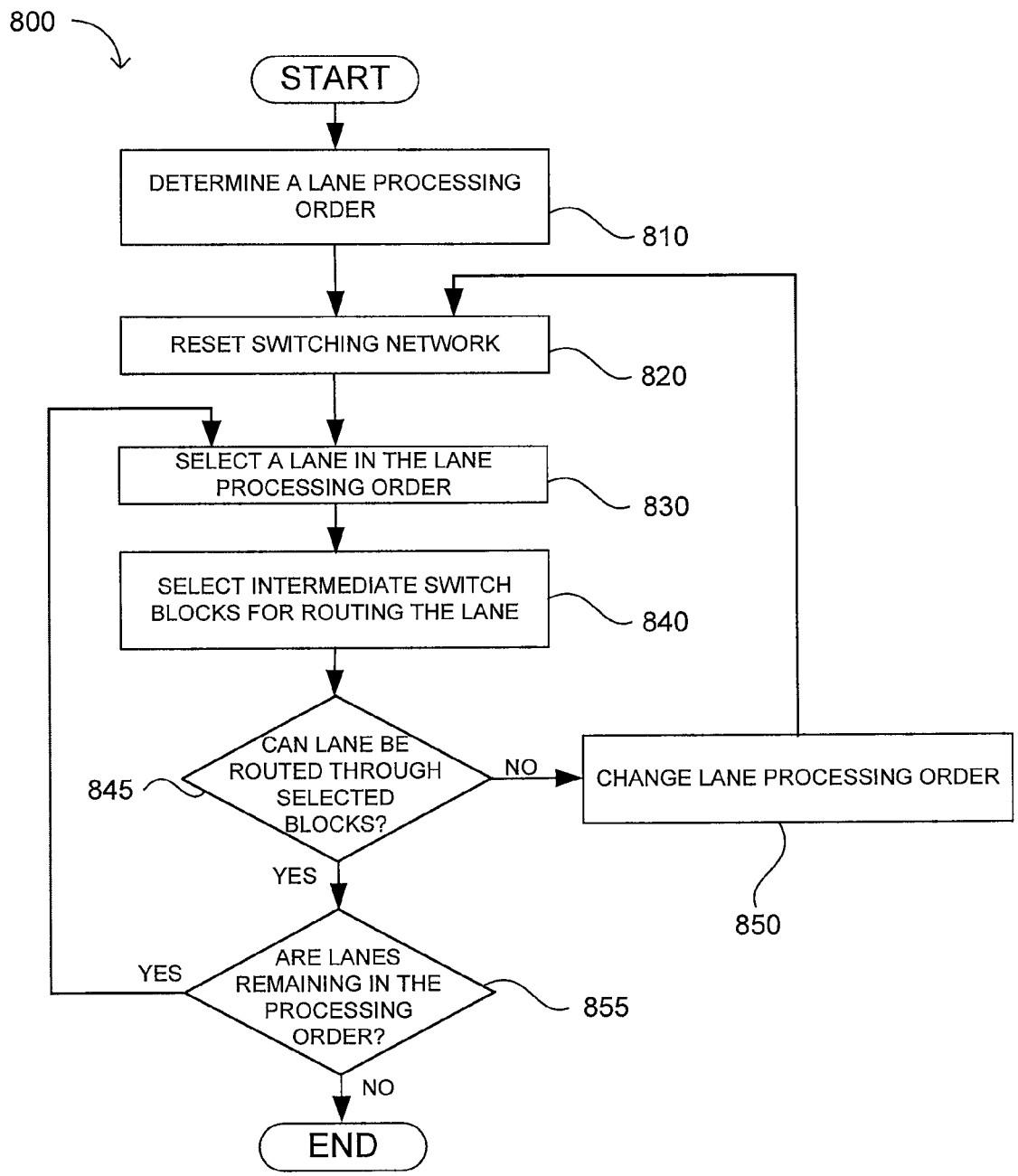
FIG. 8 is a flow chart of illustrative steps for configuring a multi-stage switching network for performing lane reordering in accordance with an embodiment of the present invention.

FIG. 8 is a flow chart 800 of illustrative steps that an alignment control circuit such as alignment control 760 may execute to configure multi-stage switching network 730 based on the current order and the desired order of the lanes coupled to the multi-stage switching network. During step 810, the alignment control may determine a lane processing order. For example, the order in which the serial channels coupled to the input ports of the multi-stage switching network are processed may be randomized. During step 820, the alignment control may reset the switching network by deleting any previously established connection between input and output ports. During step 830, the alignment control may select the first lane in the previously established processing order.

The input port to which a lane is coupled determines the input switch block used by that lane. For example, lane 19 (shown as 720A in FIG. 7) enters multi-stage switching block 730 through the top-most input port and thus uses the 4×4 crossbar 730A in the input stage of multi-stage switching block 730. Similarly, the desired output port through which a lane leaves the multi-stage switching network determines the output switch block used by that lane. For example, the bottom-most output port of multi-stage switching network 730 of FIG. 7 is the desired output port for lane 19 740A. Therefore, lane 19 uses the 4×4 crossbar 730B in the output stage of multi-stage switching network 730.

During step 840, the alignment control may select intermediate switch blocks for routing the first lane in the processing order from the pre-determined input switch block to the pre-determined output switch block. During step 845, the alignment control may check whether the lane can be routed through the selected blocks. A lane cannot be routed through a selected intermediate switch block if the intermediate switch block cannot be reached from the pre-determined input switch block or if the intermediate switch block cannot reach the pre-determined output switch block. Consider the scenario of a Clos network in which each intermediate switch block can be reached by each input switch block once and each intermediate switch block can reach each output switch block once. Consider further that only lane 19 remains to be routed and that input switch block 730A may only reach intermediate switch block 730C while only intermediate switch block 730D may reach output switch block 730B. In this scenario, lane 19 cannot be routed through an intermediate switch block.

In response to determining that the lane cannot be routed through the selected switch blocks, the alignment control may change the processing order during step 850. For example, the alignment control may place the lane that failed to route through the selected switch blocks on top of the current processing order. After changing the lane processing order, the alignment control may return to step 820.

The example of FIG. 8 in which the lane processing order is modified during step 850 is merely illustrative. If desired, the alignment control may rearrange the multi-stage switching network in different ways (e.g., instead of changing the lane processing order during step 850 and returning to step 820). For example, the alignment control may selectively remove and re-route previously established connections between input and output ports to enable the routing of currently selected lane in the processing order.

In response to determining that the lane can be routed through the selected switch blocks, the alignment control may check for remaining lanes in the processing order during step 855. If there are remaining lanes in the processing order, the alignment control may return to step 830 to select the next lane in the processing order. The alignment control has found a configuration for the multi-stage switching network if all lanes in the processing order have been successfully routed from the input port to the desired output port.

After being processed by multi-stage switching network 730 of FIG. 7, the serial channels may be in the desired order. Word and lane alignment circuits 740 may delay each of the channels as previously described in connection with FIGS. 3-6 to recognize word boundaries and achieve alignment among all serial channels. For example, word and lane alignment may have two delay blocks per lane. The first delay block may delay the serial data stream by a multiple of a given number of bits (e.g., in groups of 16 bits), while the second block may delay the serial data stream one bit at a time. For example, a shift register that is tapped at every bit with the tap feeding a multiplexer may implement a single bit delay stage. Thus, the size of the single bit delay stage may increase linearly with the number of bits. In contrast, a storage circuit may implement a first-in first-out (FIFO) block for a 16-bit delay stage with read pointers determining the number of 16-bit delay groups. In this implementation, the size of the 16-bit delay block is independent of the number of 16-bit delay groups.

If desired, word and lane alignment circuits 740 may have more or less delay stages and the selection of more or less delay stages may depend on the implementation of each delay stage and the corresponding trade-off in circuit area. For example, word and lane alignment circuits 740 may have a single delay block per lane or more than two delay blocks per lane. Delay blocks may be arranged in any order. For example, delay blocks may be arranged from biggest to smallest number of delay bits or from smallest to biggest number of delay bits, or in any other arbitrary order.

Alignment control 760 may determine for each delay block in every lane by how much the respective delay block needs to delay the corresponding serial data stream. For example, a configuration with a 16-bit delay block and a single bit delay block may delay a lane by 20 bits by using one 16-bit group of the 16-bit delay block and four single bit delays of the single bit delay block.

In the event that word and lane aligned lanes need to be reordered, the alignment control may re-assign the determined delays for the respective delay blocks from the current lane position to the new lane position.

In the example of FIG. 7, lane reordering 730 is followed by word and lane alignment 740. If desired, the processing order may change and word and lane alignment 740 may precede lane reordering 730.

After word and lane alignment 740, the serial channels may traverse a gearbox 750 (e.g., a five-way 16-bit/66-bit gearbox) that converts the serial data to parallel data which is conveyed from there to other circuitry for further processing (e.g., to a processing and storage circuit 210 of FIG. 2) and to alignment capture 770. Alignment capture 770 may inspect the serial data streams in search for alignment tags and other synchronization data (e.g., framing bits). Alignment capture 770 may also monitor for the desired order of lanes by searching for the desired lane assignment (e.g., a lane tag) in the different serial data stream. Alignment capture 770 may forward the extracted information to alignment control 760 for adjusting the control of multi-stage switching network 730 and delay blocks 740.

Figure 9:
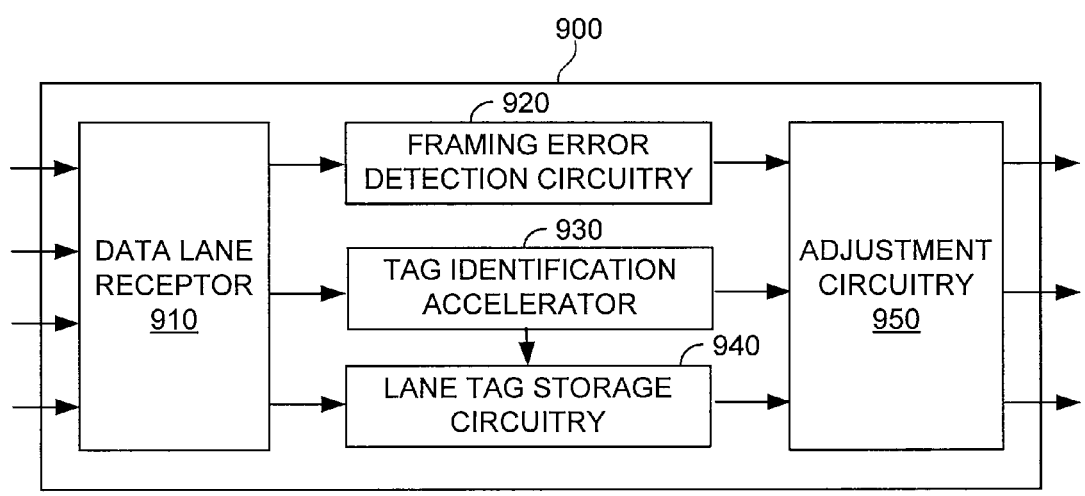
FIG. 9 is a diagram of an illustrative alignment capture and control circuit for capturing and controlling word and lane alignment and lane reordering in high-speed serial transceiver circuitry in accordance with an embodiment of the present invention.

An embodiment of an alignment capture and control circuit 900 is shown in FIG. 9. As shown, alignment capture and control circuit 900 may include data lane receptor 910, framing error detection circuitry 920, tag identification accelerator 930, lane tag storage circuitry 940, and adjustment circuitry 950. A portion or all of alignment capture and control circuit 900 may be implemented by a microcontroller or a microprocessor. In this scenario, the microcontroller or microprocessor may execute and control other tasks in addition to performing lane alignment and lane ordering and monitoring lane alignment and lane ordering during normal operation. As an example, the microcontroller or microprocessor may collect statistical information about the data received over the serial communication link (e.g., the number of packets sent for a particular telecommunications carrier or user) and generate related reports (e.g., reliability statistics, usage, billing information, etc.).

Data lane receptor 910 may receive serial data streams (e.g., from the five-way 16-bit/66-bit gearbox 750 of FIG. 7). Framing error detection circuitry 920 may search for synchronization data (e.g., framing bits) and, upon detection of such synchronization data, record the number of bits that adjustment circuitry 950 needs to delay each lane to achieve lane alignment. After identifying the delays for every lane, adjustment circuitry 950 may configure a word and lane alignment circuit (e.g., the delay blocks in word and lane alignment circuits 740 of FIG. 7) based on the recorded number of bits that each lane needs to be delayed.

Tag identification accelerator 930 in alignment capture and control circuit 900 may search for lane tags (i.e., for information within each given lane that designates a desired lane assignment for that given lane) in the serial data streams. Lane tag storage circuitry 940 may store the identified lane tags for further processing by adjustment circuitry 950.

Alignment capture and control circuit 900 may handle a portion of the serial data streams at a time. For example, alignment capture and control circuit 900 may proceed iteratively and identify synchronization data, record the number of bits of delay, and identify and store lane tags for four serial data streams during every iteration step. Thus, five iteration steps are required to identify all 20 lane tags and record the number of bits of delay for all 20 lanes. Handling a subset of the lanes at each iteration may simplify the alignment capture and control circuit 900 and thus result in smaller circuit area at the expense of a minimal time overhead required to achieve lane alignment and lane reordering, which are only performed infrequently (e.g., when physically switching cables).

After having stored all lane tags in lane tag storage circuitry 940, adjustment circuitry 950 may configure a lane reordering circuit (e.g., multi-stage switching network 730 of FIG. 7) such that input and output ports of the lane reordering circuit are coupled together according to the current lane assignment and the desired lane assignment as evidenced by the lane tags.

Figure 10:
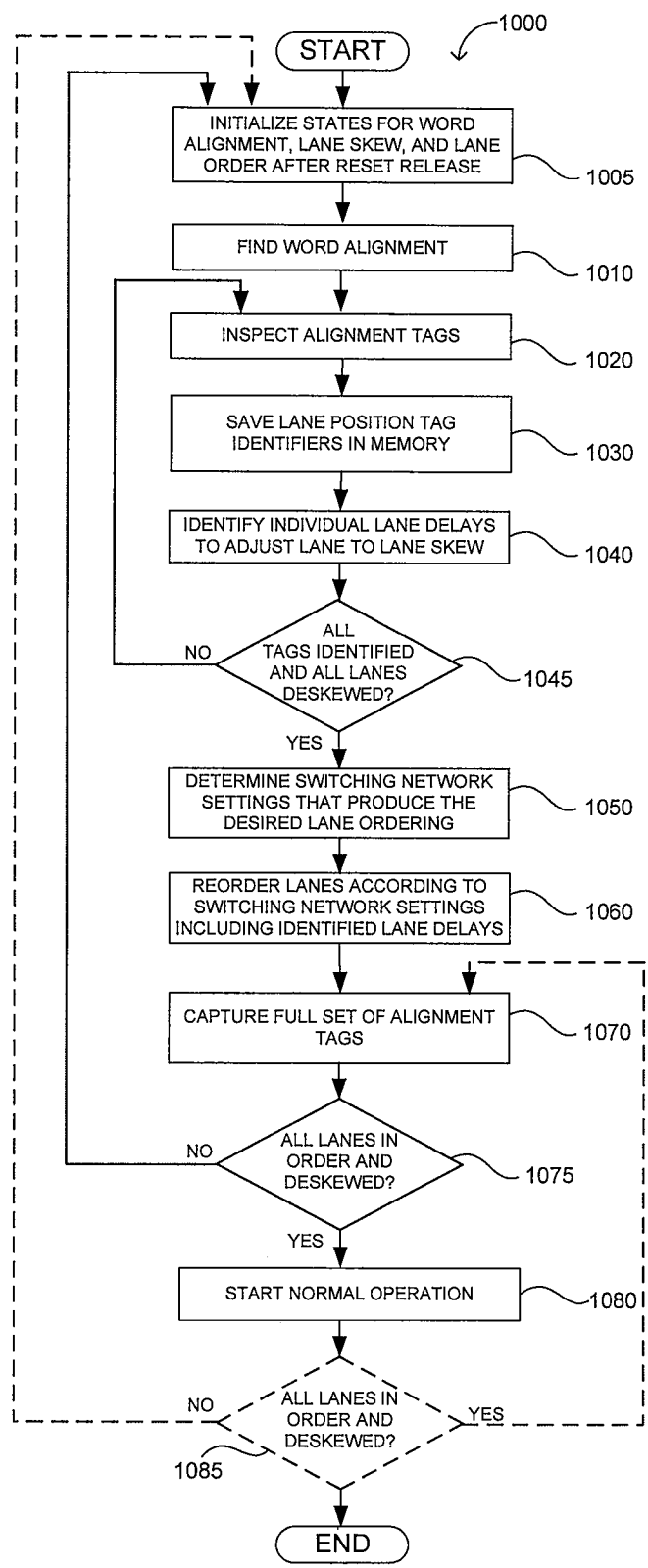
FIG. 10 is a flow chart of illustrative steps for performing lane reordering, word alignment, and lane alignment in a high-speed serial receiver circuit using an alignment circuit in accordance with an embodiment of the present invention.

FIG. 10 is a flow chart 1000 of illustrative steps for performing lane reordering, word alignment, and lane alignment using an alignment circuit (e.g., the circuitry of FIG. 7) in accordance with an embodiment of the present invention.

During step 1005, the alignment circuit may initialize the states for word alignment, lane skew, and lane order after release of a reset signal. During step 1010, the alignment circuit may find the word alignment by identifying word boundaries in each of the serial data streams. During step 1020, the alignment circuit may inspect the alignment tags located in the serial data streams. Based on the results of the inspection, the alignment circuit may save lane position tag identifiers in memory during step 1030 and identify individual lane delays (e.g., relative lane delays between the lanes) to adjust lane-to-lane skew during step 1040.

If any lanes have tags that have not yet been identified or the lanes have not all been aligned (e.g., de-skewed), the process may return to step 1020 at step 1045. Otherwise, the process may move to step 1050 to determine the switching network settings that produce the desired lane ordering. During step 1060, the alignment circuit may reorder the lanes according to the switching network settings. At the same time, the alignment circuit may re-assign previously identified lane delays together with the corresponding lanes from the position before the reordering to the position after the reordering.

In an effort to check the complete configuration of the switching network and the lane skew, the alignment circuit may capture a full set of alignment tags during step 1070 and check during step 1075 whether all lanes are in order and de-skewed. In response to determining that not all lanes are in order and de-skewed, the process may return to step 1005 to restart the alignment process. The alignment circuit may indicate to the receiver circuit to start normal operation during step 1080 if all lanes are in order and de-skewed.

Optionally, the alignment circuit may transition to a surveillance mode in which the alignments of the lanes are monitored during normal operation of the device. For example, the alignment circuit may check again if all lanes are in order and de-skewed during step 1085. If all lanes are in order and de-skewed, the alignment circuit may return to step 1070 to capture another full set of alignment tags. In response to determining that not all lanes are in order and de-skewed, the alignment circuit may return to step 1005 to start the alignment process again.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry;

and peripheral devices. The integrated circuit can be used in a wide variety of applications, such as computer networking, data networking, instrumentation, video processing, digital signal processing, or any suitable other application where the advantage of using high-speed serial interface circuitry is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method for operating serial receiver circuitry comprising:
    receiving serial data over a plurality of serial lanes;
    with an alignment circuit that controls the alignment of the plurality of serial lanes, identifying a current order of the serial lanes; and
    with the alignment circuit, configuring a multi-stage switching network to arrange the serial lanes in a desired order based on the current order.

2. The method of claim 1 further comprising:
    with the alignment circuit, identifying framing bits that delimit words in the serial data of each serial lane.

3. The method of claim 2 further comprising:
    aligning words in the serial data of each serial lane based on the framing bits.

4. The method of claim 1 further comprising:
    with the alignment circuit, identifying relative delays between the serial lanes; and
    aligning the serial lanes to reduce the relative delays.

5. The method of claim 4, wherein configuring the multi-stage switching network further comprises:
    switching the relative delays between the serial lanes based to the arrangement of the serial lanes from the current order to the desired order.

6. The method of claim 4 further comprising:
    monitoring the alignment of the serial lanes to detect a misalignment between the serial lanes.

7. The method of claim 6, wherein identifying the relative delays between the serial lanes comprises:
    in response to detecting the misalignment between the serial lanes, identifying the relative delays between the serial lanes.

8. The method of claim 1 further comprising:
    monitoring the order of the serial lanes; and
    in response to detecting a deviation of the monitored order of the serial lanes from the desired order, configuring the multi-stage switching network to re-arrange the serial lanes in the desired order based on the monitored order.

9. The method of claim 1, wherein identifying the current order of the multiple serial lanes further comprises:
    inspecting lane position tag identifiers in the serial data of each serial lane.

10. The method of claim 9, wherein identifying the current order of the multiple serial lanes further comprises:
    saving lane position tag identifiers to memory.

11. The method of claim 1, wherein the multi-stage switching network includes a first, second, and third switching stage.

12. The method of claim 11, wherein the first and third switching stages each have a same number of crossbar switches.

13. A method for configuring a multi-stage switching network having inputs and outputs, an input stage including input switch blocks coupled to the inputs, an output stage including output switch blocks coupled to the outputs, and at least one intermediate stage coupled between the input and output stages wherein each intermediate stage includes at least one intermediate switch block, comprising:
    with a plurality of serial link lanes coupled to corresponding inputs of the multi-stage switching network, receiving a plurality of serial data streams;
    inspecting each serial data stream to identify a corresponding desired output of the multi-stage switching network;
    for each serial link lane, selecting an input switch block based on the corresponding input of the multi-stage switching network;
    for each serial link lane, selecting an output switch block based on the corresponding desired output of the multi-stage switching network;
    for each serial link lane, selecting intermediate switch blocks that couple the selected input switch block to the selected output switch block; and
    determining whether the selected intermediate switch blocks allow coupling the selected input switch block to the selected output switch block.

14. The method of claim 13, wherein the multi-stage switching network comprises a Clos network.

15. The method of claim 13, wherein selecting intermediate switch blocks further comprises:
    determining a processing order for the serial link lanes including a first serial link lane and subsequent serial link lanes; and
    for the first serial link lane in the processing order, selecting intermediate switch blocks that couple the selected input switch block to the selected output switch block.

16. The method of claim 15 further comprising:
    in response to determining that the selected intermediate switch blocks allow coupling the selected input switch block to the selected output switch block, recording the selected intermediate switch blocks as coupling the selected input switch block to the selected output switch block; and
    for a subsequent serial link lane in the processing order, selecting intermediate switch blocks that couple the selected input switch block to the selected output switch block.

17. The method of claim 16 further comprising:
    in response to determining that the selected intermediate switch blocks do not allow to couple the selected input switch block to the selected output switch block, reordering the processing order;
    resetting the recorded intermediate switch blocks; and
    for the first serial link lane in the changed processing order, selecting intermediate switch blocks that couple the selected input switch block to the selected output switch block.

18. Alignment circuitry for aligning serial data received over a plurality of serial link lanes, comprising:
    a multi-stage switch network coupled to the serial link lanes that receives the serial data from the serial link lanes and reorders the serial link lanes based on a desired serial link lane order;
a delay circuit coupled to the multi-stage switch network that receives the reordered serial data from the multi-stage switch network and delays the serial data on selected lanes of the reordered serial link lanes; and
a control circuit that monitors the serial data passing through the multi-stage switch network and the delay circuit, wherein the control circuit controls the multi-stage switch network and the delay circuit based on the monitored serial data.

19. The alignment circuitry of claim 18, wherein the multi-stage switch network comprises a Clos network.

20. The alignment circuitry of claim 18 further comprising:
a word alignment detection circuit coupled to the multi-stage switch network that receives the serial data from the multi-stage network and identifies word boundaries in the serial data.

21. The alignment circuitry of claim 18, wherein the control circuit further comprises:
an accelerator circuit that receives the serial data and inspects the received serial data to identify alignment tags; and
a storage circuit coupled to the accelerator circuit that receives the identified alignment tags from the accelerator circuit and stores the received alignment tags for further processing by the control circuit.

22. The alignment circuitry of claim 21, wherein the accelerator circuit inspects a first subset of the serial link lanes at a first time and inspects a second, different subset of the serial link lanes at a second time.

23. Alignment circuitry for aligning serial data received over a plurality of serial link lanes, the alignment circuitry comprising:
a delay circuit coupled to the serial link lanes that receives the serial data from the serial link lanes and delays the serial data on selected lanes of the serial link lanes; and
a multi-stage switch network coupled to the delay circuit that receives the serial data from the delay circuit and reorders the serial link lanes; and
a control circuit that monitors the serial data passing through the delay circuit and the multi-stage switch network, wherein the control circuit controls the delay circuit and the multi-stage switch network based on the monitored serial data, and wherein the control circuit comprises an accelerator circuit that identifies alignment tags for the serial data by inspecting a first subset of the serial link lanes at a first time and a second subset of the serial link lanes that is different from the first subset at a second time.

24. The alignment circuitry of claim 23, wherein the multi-stage switch network comprises a Clos network.

25. The alignment circuitry of claim 23 further comprising:
a word alignment detection circuit coupled to the delay circuit that receives the serial data from the delay circuit and identifies word boundaries in the serial data.

26. The alignment circuitry of claim 23, wherein the control circuit further comprises:
a storage circuit coupled to the accelerator circuit that receives the identified alignment tags from the accelerator circuit and that stores the received alignment tags for further processing by the control circuit.

27. A method for operating serial receiver circuitry comprising:
receiving serial data over a plurality of serial lanes;
with an alignment circuit that controls alignment of the plurality of serial lanes, identifying synchronization data in the serial data of each serial lane, wherein the alignment circuit is formed on an integrated circuit;
with the alignment circuit, identifying relative delays between the serial lanes based on the identified synchronization data;
with the alignment circuit, aligning the serial lanes to reduce the relative delays;
with the alignment circuit, identifying a current order of the serial lanes; and
with the alignment circuit, configuring a multi-stage switching network on the integrated circuit to arrange the serial lanes in a desired order based on the current order.

28. The method of claim 27 further comprising:
monitoring the alignment of the serial lanes to detect a misalignment between the serial lanes; and
in response to detecting the misalignment between the serial lanes, identifying the relative delays between the serial lanes.

29. The method of claim 27, wherein configuring the multi-stage switching network further comprises:
switching the relative delays between the serial lanes based to the arrangement of the serial lanes from the current order to the desired order.

* * * * *